L. COES.
Manufacture of Cutter-Stocks.

No. 155,180.             Patented Sept. 22, 1874.

Witnesses.        Inventor

UNITED STATES PATENT OFFICE.

LORING COES, OF WORCESTER, MASSACHUSETTS.

IMPROVEMENT IN THE MANUFACTURE OF CUTTER-STOCKS.

Specification forming part of Letters Patent No. 155,180, dated September 22, 1874; application filed July 15, 1874.

*To all whom it may concern:*

Be it known that I, LORING COES, of Worcester, in the county of Worcester and State of Massachusetts, have invented certain new and useful Improvements in the Manufacture of Cutter-Stock; and I do hereby declare that the following is a full, clear, and exact description of the same, reference being had to the accompanying drawings, which form a part of this specification, and in which—

Figure 7:
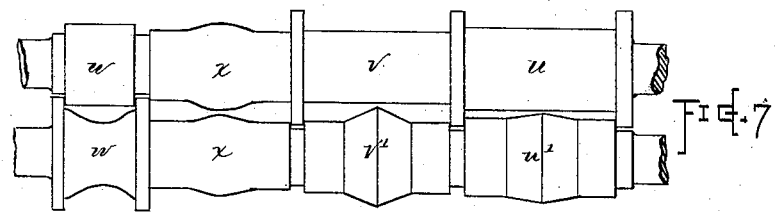
Figure 5:
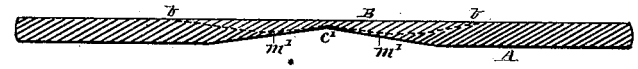
Figure 6:
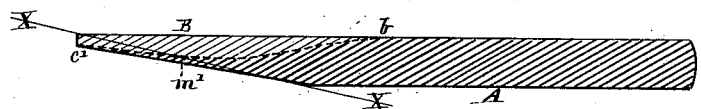

Figures 1, 2, 3, 4, and 5 represent transverse sections of the material at different stages of the manufacture. Fig. 6 represents, on an enlarged scale, a piece of finished stock; and Fig. 7 represents, on a reduced scale, the forms of the several rolls employed for reducing and welding the material.

To enable others skilled in the art to which my invention belongs to make and use the same, I herein describe it in detail.

This invention consists in the peculiar manner of forming and arranging the material in the fagot, and in the improved method of welding and dividing the material by angular-faced welding-rolls, as hereinafter set forth, whereby a superior weld or union is obtained, while the steel facing is laid upon the iron in desirable and appropriate form, thus producing a quality of cutter-stock of superior excellence.

Figure 3:
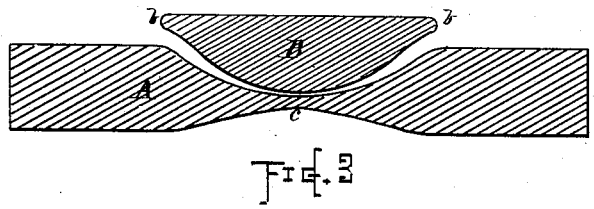
Figure 1:
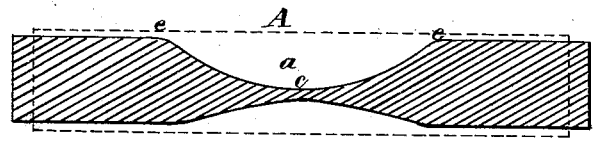
Figure 2:
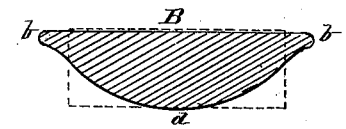
Figure 4:
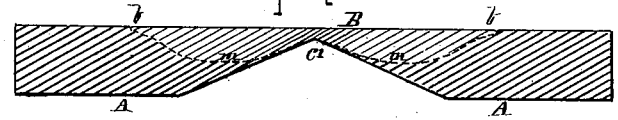

My improved process of manufacturing the cutter-stock is as follows, viz: Rectangular bars of iron and steel of the proper length are heated and passed between rolls, of the form shown at $x$ $w$, to reduce them to the forms shown, respectively, in Figs. 1 and 2, the bar A of iron being reduced at its center, so as to form a concave channel or a hollow, $a$, along its upper surface, and at its lower side sufficiently to leave a comparatively thin section at $c$ along its center, while the outer edges of the bar are left thick and square. The bar of steel B is reduced at its outer edges $b$ $b$, giving to its under surface a convex form, or a form corresponding with the hollow $a$, but with a shorter curvature, or so that chords from the points $b$ $d$ $b$ of the bar B embrace a less angle than chords from the points $e$ $c$ $e$ of the channel $a$. The bars A and B, when thus formed, are arranged in a fagot, as shown in Fig. 3, the steel B being laid into the channel $a$ of the iron A, the difference of curvature in their two surfaces being such that the central portion of the bar B will rest upon the bottom of the channel $a$, while the edges $b$ $b$ remain a short distance from the top surface of the bar A. The two bars are in this position heated to a proper degree for welding, their surfaces being suitably fluxed at the proper time, and while in this condition are placed beneath a drop, the die of which is made to fit the bottom side of the bar A, and by the drop falling upon the bar B the two bars are caused to adhere to each other along the center of the channel, thus securing said bars sufficiently to prevent them from curling away from each other, or twisting out of proper relative position in the subsequent operation of rolling, while the force of the blow also tends to eject any scale, slag, or other impurities from between the surfaces to be welded, since it closes the space between said surfaces from the center $c$ outward toward the edges $b$ $b$. The fagot is next returned to the furnace to restore any degree of heat lost by the operation beneath the drop. It is then subjected to pressure between the welding-rolls $v$ $v'$, Fig. 7, one of which is made with a straight face, while the face of the other, $v'$, is provided with a projection or swell terminating with an angular edge at its center, which angle is pressed up into the central portion of the fagot as the latter passes between the rolls, thus dividing the bulk of the iron and steel, and forcing the material toward the sides, as shown in Fig. 4, the center $c'$ being left quite thin, so that the iron at said point $c'$ is nearly or quite separated, while the steel is caused to assume the position indicated by dotted lines, its mass being left thickest at the points $m$ $m$ and the edges $b$ $b$, and the entire surface of the steel is pressed into and firmly welded to the iron.

It will be noticed that the force of the welding-rolls first acts on the central part of the fagot, and thus performs the operation of welding from the center toward the edges $b$ $b$, making, as it were, a wiping weld between the surfaces, and thus squeezing out all impurities or gas that may have been left between the pieces, and flattening the edges $b$ $b$ into the surface of the iron in a smooth and uniform manner as the bar is drawn out by the straight portion of the rolls, the entire action being such that a comparatively perfect weld or union is formed between the steel and iron throughout all parts of the bar.

It is desirable that the central point $c'$ should be, by the welding-rolls, reduced nearly as thin as may be required for the finished stock. The stock, after welding, is passed once or more between finishing-rolls, by which it is reduced to the required dimensions. These finishing-rolls $u\ u'$ are made of a proper form to reduce the thickness of the stock, while they preserve the relative form of the steel and iron as laid by the welding-rolls, so that in the finished bar, Fig. 5, the thickest portion of steel is at the points $m'\ m'$. The stock is next divided into two pieces by a shear-cut along the center $c'$, and is then ready to be worked up into cutters of various kinds.

It will be observed that by laying the steel in the manner shown at $m'$ there is left upon its surface but a thin coating of iron, which is entirely removed by the grinding of the cutters, (see line $x\ x$, Fig. 6,) thus leaving a steel surface of the required width, or greater than the thickness of the leather or other material on which the cutters are to be used.

The chief and most essential features of my improved process of manufacturing the cutter-stock are, the reduction of the central part of the iron at the channel $a$; the arrangement of the bar of steel at the central part of the iron in such manner that the welding-surfaces shall be closed from the center toward the edges $b\ b$; and the division of the material at $c'$ when forming the weld by means of an angular-faced roll.

Among the advantages attained by this process may be mentioned the rapid and cheap production of the cutter-stock, two pieces being formed at each rolling; its superior quality and perfection of the weld or union between the steel and iron; also, the peculiar form of the steel at $m'$, it being so rounded that the grinding will reveal a wide steel face.

Having described my invention, I will state that I am aware that cutter-stock has heretofore been made by welding steel to the side of an iron bar, and rolling it to the edge thereof, and I do not herein make claim to such mode of manufacture; but What I do claim as new and of my invention, and desire to secure by Letters Patent, is—

The within-described process for forming cutter-stock, whereby the iron A and steel B are arranged as shown, and are welded and divided at $c'$ by an angular-faced roll, substantially as and for the purpose set forth.

LORING COES.

Witnesses:
CHAS. H. BURLEIGH,
GEO. J. MONEY.